(12) United States Patent
Martinez et al.

(10) Patent No.: US 10,057,220 B2
(45) Date of Patent: Aug. 21, 2018

(54) MESSAGE ENCRYPTION

(71) Applicant: International Business Machines Corporation, Armonk, NY (US)

(72) Inventors: Anthony E. Martinez, Orcas, WA (US); Vanessa V. Michelini, Boca Raton, FL (US); Vishwa Persaud, Woodbridge, NJ (US)

(73) Assignee: International Business Machines Corporation, Armonk, NY (US)

( * ) Notice: Subject to any disclaimer, the term of this patent is extended or adjusted under 35 U.S.C. 154(b) by 307 days.

(21) Appl. No.: 14/808,039

(22) Filed: Jul. 24, 2015

(65) Prior Publication Data
US 2017/0026348 A1    Jan. 26, 2017

(51) Int. Cl.
*H04L 29/06* (2006.01)
*H04L 9/08* (2006.01)
*G06F 21/62* (2013.01)
*G06F 21/60* (2013.01)

(52) U.S. Cl.
CPC ........ *H04L 63/0442* (2013.01); *G06F 21/606* (2013.01); *G06F 21/6263* (2013.01); *H04L 9/0825* (2013.01)

(58) Field of Classification Search
CPC ...... G06F 21/10; G06F 21/31; G06F 21/6263; G06F 3/04886; H04L 63/08; H04L 63/0442; H04L 9/0825
USPC ............. 713/189, 160, 168; 726/2, 5, 26–27
See application file for complete search history.

(56) References Cited

U.S. PATENT DOCUMENTS

| | | | |
|---|---|---|---|
| 7,861,096 B2 | 12/2010 | Staddon et al. | |
| 8,291,239 B2 | 10/2012 | Pintsov | |
| 8,380,173 B2* | 2/2013 | Zinn | H04W 4/12 455/412.1 |
| 8,542,823 B1 | 9/2013 | Nguyen et al. | |
| 9,100,493 B1* | 8/2015 | Zhou | H04M 1/72522 |
| 2006/0103590 A1* | 5/2006 | Divon | G02B 27/01 345/7 |

(Continued)

FOREIGN PATENT DOCUMENTS

WO    2015012867 A1    1/2015

OTHER PUBLICATIONS

Forte et al., "EyeDecrypt—Private Interactions in Plain Sight," Proc. 9th Conference on Security and Cryptography for Networks, 2014, 19 pages.

(Continued)

*Primary Examiner* — Samson Lemma
(74) *Attorney, Agent, or Firm* — Kristofer L. Haggerty

(57) ABSTRACT

The computer receives customer registration information and encryption parameters from a customer, then transmits them to the server of an entity such as a pharmacy or bank. After the entity utilizes the transmitted encryption parameters to encrypt confidential portions of a message to the customer, the computer captures the message by way of receiving, photographing, scanning, or otherwise obtaining a copy of the message. The computer identifies glyphs in the message indicative of the corresponding encryption parameters as well as where the encrypted portions of the message start/end. Using the identified glyphs and corresponding encryption parameters, the computer decrypts the confidential portions of the message and displays the message in entirety on the computer.

12 Claims, 6 Drawing Sheets

(56) References Cited

U.S. PATENT DOCUMENTS

| | | | |
|---|---|---|---|
| 2012/0314865 A1 | 12/2012 | Kitchen | |
| 2013/0124326 A1* | 5/2013 | Huang | G06Q 30/0255 |
| | | | 705/14.64 |
| 2014/0136828 A1* | 5/2014 | Lewis | G06F 9/4445 |
| | | | 713/2 |
| 2014/0143295 A1* | 5/2014 | Girsch | H04L 67/141 |
| | | | 709/202 |
| 2014/0267000 A1* | 9/2014 | Yuen | G06K 9/00671 |
| | | | 345/156 |
| 2016/0092877 A1* | 3/2016 | Chew | G06Q 20/4012 |
| | | | 705/72 |
| 2016/0162592 A1* | 6/2016 | Li | G06F 17/30876 |
| | | | 235/375 |
| 2016/0182462 A1* | 6/2016 | Vaquero Gonzalez | G06F 21/62 |
| | | | 713/171 |

OTHER PUBLICATIONS

Wikipedia, the Free Encyclopedia, "Optical character recognition," http://en.wikipedia.org/wiki/Optical_character_recognition, last modified on Apr. 7, 2015, pp. 1-9.
Google Quest Visual, "Word Lens," http://questvisual.com/, printed on Jul. 23, 2015, p. 1 of 1.

* cited by examiner

US 10,057,220 B2

MESSAGE ENCRYPTION

TECHNICAL FIELD

The present invention relates generally to information transmission, and more particularly to encrypting transmitted information.

BACKGROUND

It is often necessary to send correspondence of a confidential or personal nature via postal or email means. However, due to the possibility of such correspondence being intercepted by an unintended party, many enterprises have resorted to stripping the confidential content from the correspondence and instead direct the recipient to a secure website or telephone number. The confidential information is then revealed after further authentication. While this method is indeed more secure, it greatly increases the number of steps required to achieve the result, and is often quite inconvenient to the recipient.

SUMMARY

Embodiments of the present invention disclose a method, system, and computer program product for a message encryption system. The computer receives customer registration information and encryption parameters from a customer, then transmits them to the server of an entity such as a pharmacy or bank. After the entity utilizes the transmitted encryption parameters to encrypt confidential portions of a message to the customer, the computer captures the message by way of receiving, photographing, scanning, or otherwise obtaining a copy of the message. The computer identifies glyphs in the message indicative of the corresponding encryption parameters as well as where the encrypted portions of the message start/end. Using the identified glyphs and corresponding encryption parameters, the computer decrypts the confidential portions of the message and displays the message in entirety on the computer.

DETAILED DESCRIPTION

Embodiments of the present invention will now be described in detail with reference to the accompanying figures.

Figure 1:
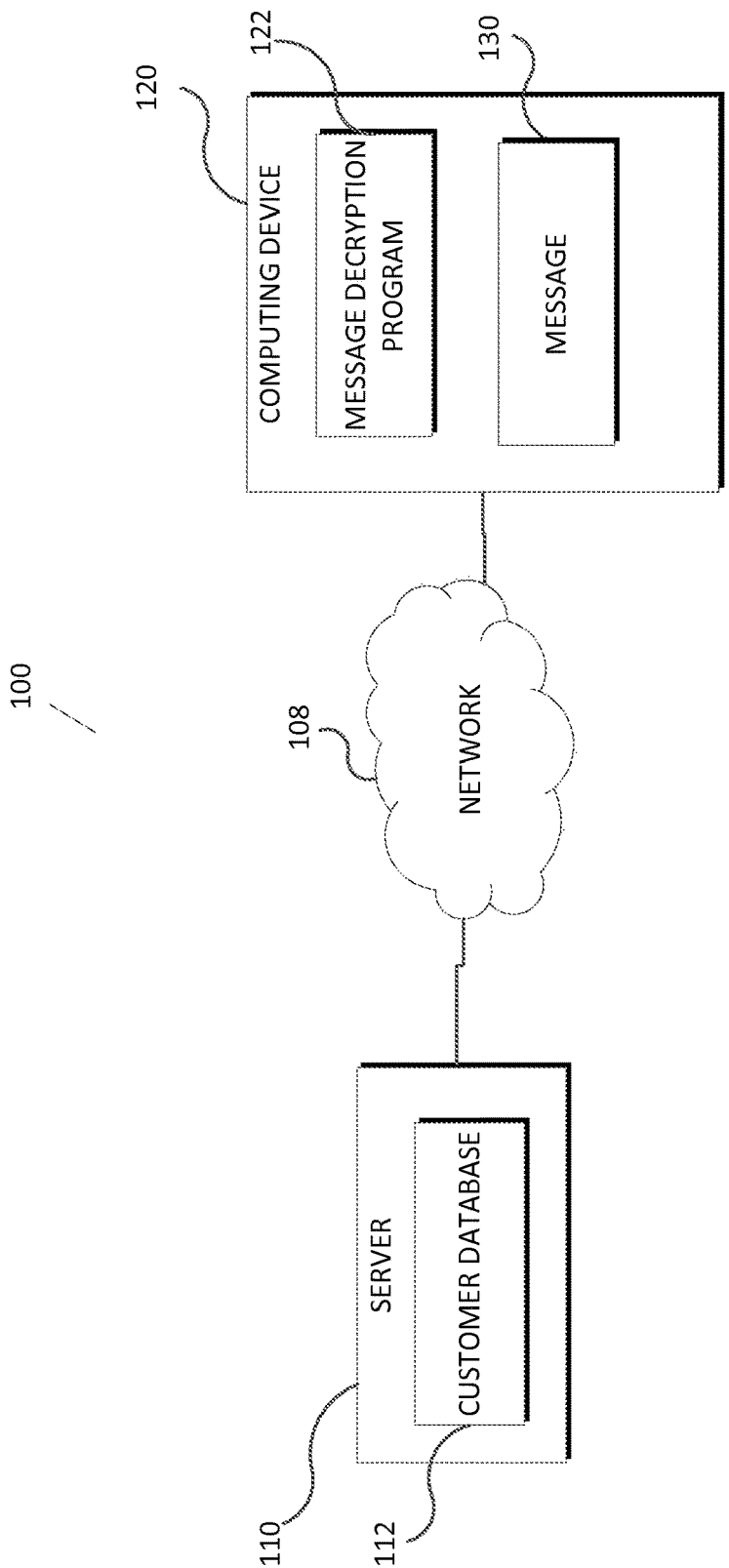
FIG. 1 illustrates message encryption system 100, in accordance with an embodiment of the invention.

FIG. 1 illustrates a message encryption system 100, in accordance with an embodiment of the invention. In the example embodiment, the message encryption system 100 includes computing server 110, network 108, and computing device 120.

Network 108 may be the Internet, representing a worldwide collection of networks and gateways to support communications between devices connected to the Internet. Network 108 may include, for example, wired, wireless or fiber optic connections. In other embodiments, network 108 may be implemented as an intranet, a local area network (LAN), or a wide area network (WAN). In general, network 108 can be any combination of connections and protocols that will support communications between server 110 and computing device 120.

Server 110 includes customer database 112. In the example embodiment, server 110 may be a laptop computer, a notebook, tablet computer, netbook computer, personal computer (PC), a desktop computer, a personal digital assistant (PDA), a smart phone, a thin client, or any other electronic device or computing system capable of receiving and sending data to and from other computing devices. While server 110 is shown as a single device, in other embodiments, server 110 may be comprised of a cluster or plurality of computing devices, working together or working separately. Server 110 is described in more detail with reference to FIG. 3.

Customer database 112 is an organized collection of data detailing the customers of an entity such as a pharmacy or bank. In the example embodiment, customer database 112 includes information such as customer names, usernames, addresses, phone numbers, dates of birth, social security numbers, and other information relevant to the customer-entity relationship. In the example embodiment, customer database 112 also contains customer encryption parameters that include symmetrical or asymmetrical keys used by the customer and entity to encrypt and decrypt transmitted confidential subject matter. In addition, the customer encryption parameters contained in customer database 112 include an association between customer information, the encryption parameters of the customer, and a unique sender identifier key described in greater detail in FIG. 4. Customer database 112 may be populated via user input locally on server 110 or remotely over a secure communication channel via network 108.

Computing device 120 includes message 130 and message decryption program 122. In the example embodiment, computing device 120 may be a laptop computer, a notebook, tablet computer, netbook computer, personal computer (PC), a desktop computer, a personal digital assistant (PDA), a smart phone, a thin client, or any other electronic device or computing system capable of receiving and sending data to and from other computing devices. While computing device 120 is shown as a single device, in other embodiments, computing device 120 may be comprised of a cluster or plurality of computing devices, working together or working separately. In the example embodiment, computing device 120 includes a built in camera and means to scan documents. Computing device 120 is described in more detail with reference to FIG. 3.

Message 130 is a document containing confidential subject matter communicated between an entity and a customer. In the example embodiment, message 130 is an electronic document sent via email, however in other embodiments, message 130 may be another electronic communication such as a peer-to-peer transfer, text message, or download. In further embodiments, message 130 may be a printed or other hardcopy document sent via means such as a postal service which is scanned or photographed by computing device 120. In the example embodiment, the confidential subject matter of message 130 is encrypted by a sending entity, such as a pharmacy or bank, and decrypted by a customer on a computing device, such as computing device 120, using message decryption program 122. Furthermore, in the example embodiment, the encrypted information contained in message 130 is in the form of alphabetic characters, numeric characters, pictures, symbols, images, and other characters capable of conveying a message. In other embodiments, message 130 may contain non-confidential and/or confidential information subject to change depending on conditions or circumstances. For example, glyphs, or characters denoting the encrypted portions of message 130, may be placed around measurement specifications in recipes which are adjusted according to the amount of required servings or preferred units of a user. Similarly, in other embodiments, glyphs may be placed around words requiring translation, such as technical terms detailing medical conditions or legal terms which are unfamiliar to an average person. In further embodiments, message 130 may also be scanned versions of printed documents, such as user manuals, which can be updated utilizing glyphs which were added in the event that more information need be amended.

Message decryption program 122 is a program on computing device 110 capable of communicating with server 110 via network 108. In the example embodiment, message decryption program 122 is capable of registering a customer within a database, such as customer database 112, of an entity such as a pharmacy or bank. Message decryption program 122 is further capable of configuring encryption parameters between the customer and the entity, such as which encryption technique will be utilized for transmitting confidential information. Message decryption program 122 is additionally capable of receiving an encrypted message, either electronically or by capture, from the entity and utilizing the configured encryption parameters to decrypt the encrypted message exchanged between the customer and entity.

Figure 2:
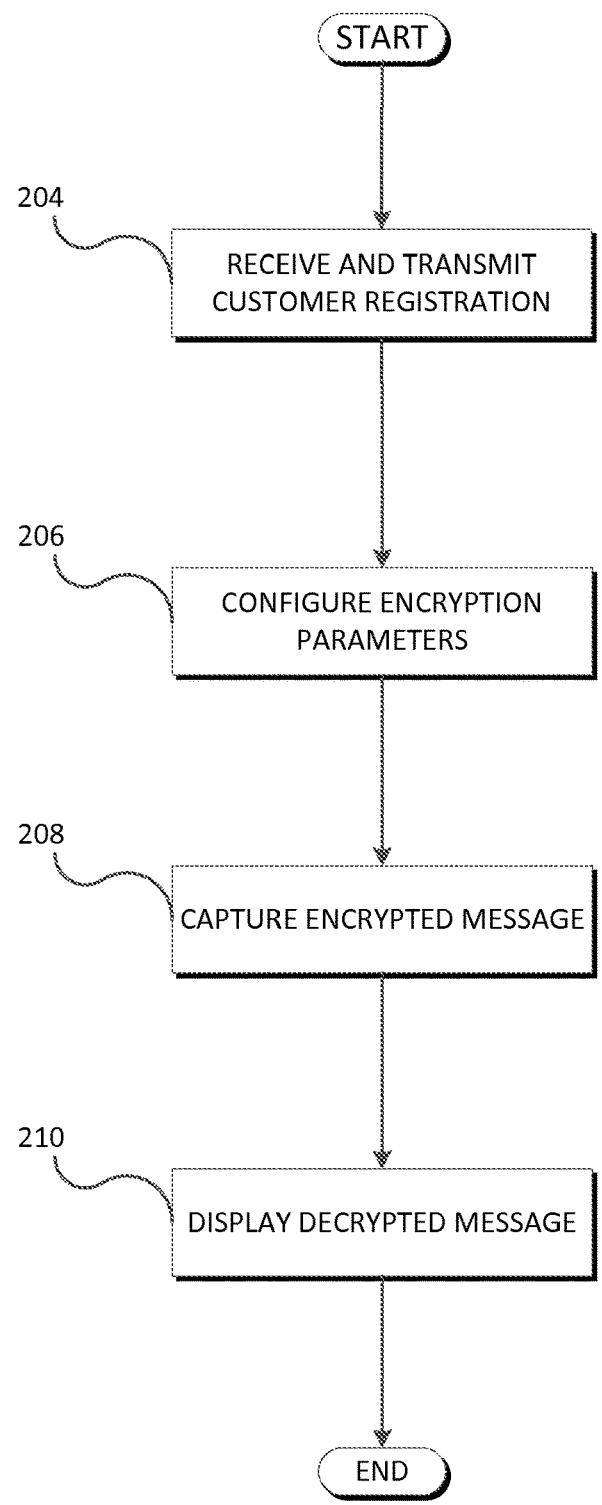
FIG. 2 is a flowchart illustrating the operations of a message encryption program of FIG. 1 in decrypting encrypted confidential messages between a customer and entity, in accordance with an embodiment of the invention.

FIG. 2 is a flowchart depicting the operation of message decryption program 122 in decrypting encrypted confidential messages transmitted between a customer and entity, in accordance with an embodiment of the present invention. Message decryption program 122 receives customer registration information from a customer and transmits that information to customer database 112 (step 204). In the example embodiment where message decryption program 122 is stored on computing device 120, message decryption program 122 receives customer registration information via a user interface on computing device 120 and transmits that information to customer database 112 via network 108. In the example embodiment, customer registration information is stored in database 112 and is associated with a customer username and password which is input by the user via a device, such as computing device 120. Customer registration information includes details such as customer names, usernames, addresses, phone numbers, dates of birth, social security numbers, bank account information, medical records, portfolio information, and any other information relevant to the customer-entity relationship. Furthermore, customer database 112 also contains customer encryption parameters that include public and/or private keys used by the entity to encrypt confidential subject matter prior to transmission (encryption parameters described in further detail in step 206). While in the example embodiment customer registration information is entered by the user into message decryption program 122 via a user input, in other embodiments customer registration information may be transmitted to message decryption program 122 by way of user input via a web browser or other electronic means. In further embodiments, customer registration with message decryption program 122 may be performed via postal service or in person.

Message decryption program 122 configures the encryption parameters between the customer and entity (step 206). Configuring the encryption parameters includes both the customer and user choosing an encryption technique as well as performing the initial setup of generating and/or exchanging encryption keys. While many different encryption techniques exist, the example embodiment utilizes an asymmetric key algorithm, (public-key cryptography), wherein the customer is provided both a public key which encrypts and a private key which decrypts. The keys are unique and asymmetrical in that only one private key will decrypt a message encrypted by the corresponding public key. In a public-key cryptography system, the customer sends their public key to the entity who then encrypts the message using the public key provided by the customer. The encrypted message is then sent to the customer, who then uses the corresponding private key to decrypt the received message. Thus, in the example embodiment where an asymmetric key algorithm is utilized, configuring the encryption parameters starts with message decryption program 122 generating a public key and a private key on the customer device (computing device 120). The private key for decrypting is retained on the customer device while the public key is transmitted to an entity (such as server 110) for encrypting future confidential messages, and may be stored in customer database 112 in association with the relevant customer information for the purposes of future encryptions. This technique is advantageous because only public keys are transmitted electronically between the customer and entity, eliminating the risk of leaking a private key capable of decrypting to an interceptor. In other embodiments, message decryption program 122 may utilize other encryption techniques such as a symmetric key algorithm in which the customer and entity both retain an identical encryption/decryption key to encrypt/decrypt correspondence. In embodiments utilizing symmetric key encryption methods, message decryption program 122 generates an identical key for both the customer and the entity. One copy of the identical key is transmitted to the entity while the customer retains the other copy of the identical key on computing device 120 and both the entity and customer utilize their copies of the identical key to encrypt and decrypt confidential messages.

Message decryption program 122 captures the encrypted information contained in message 130 (step 208). In the example embodiment where message 130 is a softcopy document received by computing device 120, message decryption program 122 captures the information contained in message 130 by receiving message 130 via network 108. In other embodiments where message 130 is a softcopy document transmitted to a different computing device, message decryption program 122 may utilize the camera on computing device 120 to photograph message 130 on other computing devices. For example, the camera on device such as a smart phone, tablet, or laptop may be utilized to capture message 130 on a desktop computer, television, alternative laptop, alternative smart phone, or other electronic device. Furthermore, in other embodiments, message 130 may be a hardcopy communication delivered to the user via a postal service, in person, or by other means before being photographed or scanned into message decryption program 122. In the example embodiment, the customer first sends a public key generated by message decryption program 122 during the configuration process of step 206 to the entity for encrypting confidential portions of message 130. The entity, after encrypting confidential portions of message 130 using the public key, then sends message 130 to the customer via email (or other means) where, upon receipt by the customer device (computing device 120), message decryption program 122 opens message 130. In the example embodiment, confidential portions of message 130 are indicated by glyphs at the start and end of the encrypted portions of message 130. When message decryption program 122 captures encrypted message 130, message decryption program 122 utilizes document search functions, such as optical character recognition, to identify the locations of a starting glyph and an ending glyph which denote the encrypted portions of message 130. Optical character recognition involves comparing an image to a stored glyph on a pixel-by-pixel basis (pattern matching). Using optical character recognition, message decryption program 122 compares the captured image of message 130 with the image of a customer-specific sender identifier key 302C (described in greater detail in FIG. 4) stored in customer database 112 during the encryption configuration step. In addition to denoting the encrypted portions of message 130, the glyph also identifies the customer and associated encryption parameters by way of referencing customer database 112 which contains information associating the customer with a sender identifier key 302C (glyphs contained in message 130 are described in further detail in FIG. 3, FIG. 4, and FIG. 5). In other embodiments where message 130 is a paper document, message decryption program 122 captures message 130 via a camera or scanning device. Message decryption program 122 then decrypts message 130 using the private key retained on computing device 120 generated during the configuration process of step 206.

Message decryption program 122 displays the decrypted message (step 210). In the example embodiment, message decryption program 122 displays the decrypted message on the screen on computing device 120 within message encryption program, however in other embodiments, the decrypted message may be saved, transmitted, or printed. Furthermore, in the example embodiment, the decrypted portions of message 130 are superimposed in line with the non-encrypted portions of message 130, providing a seamless transition between the encrypted and non-encrypted portions of message 130.

Figure 3:
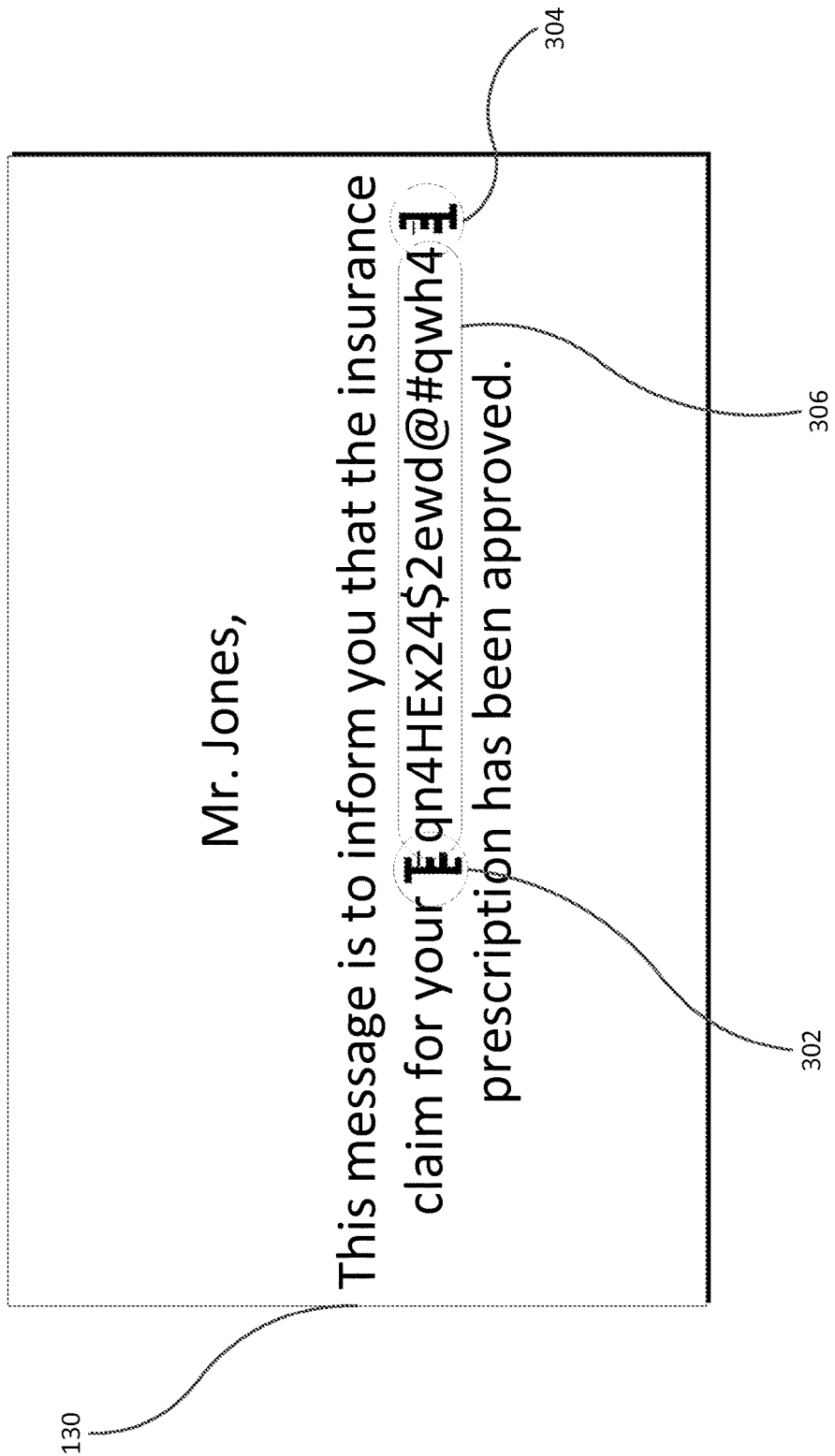
FIG. 3 illustrates an encrypted message 130, in accordance with an embodiment of the invention.

FIG. 3 depicts an encrypted message 130 containing starting glyph 302, encrypted portion 306, and ending glyph 304. In the example embodiment, encrypted portion 306 is encrypted by an entity using an asymmetric, public key generated by message decryption program 122. Furthermore, in the example embodiment, message decryption program 122 identifies starting glyph 302 and ending glyph 304 (the glyphs) in order to determine which customer is associated with the corresponding confidential message represented by encrypted portion 306. While in the example embodiment starting glyph 302 and ending glyph 304 are flipped mirror images of each other, in other embodiments starting glyph 302 and ending glyph 304 may take on different shapes and characteristics.

In the example embodiment, encrypted portion 306 contains a single, encrypted message intended for a single recipient (single-layer encryption). As described by step 208 of the flowchart of FIG. 2, message decryption program 122 captures message 130 to determine which recipient and private key are associated with starting glyph 302 and ending glyph 304 (the glyphs). After determining which recipient and private key are associated with the glyphs by referencing customer database 112, message decryption program 122 decrypts encrypted portion 306 with the private key corresponding to the recipient. In the example embodiment where single-layer encryption is utilized, encrypted portion 306 is comprised of an encrypted version of the confidential message contained in message 130 because the glyphs are only associated with a single recipient and a single corresponding message. For example, if message 130 of FIG. 3 is sent to Mr. Jones indicating his prescription for "Acetylsalicylic Acid 81 MG" is ready for pickup, then the characters "qn4HEx24$2ewd@#qwh4" are an encrypted version of the letters and numbers comprising the words "Acetylsalicylic Acid 81 MG." Thus, because only one confidential message is transmitted in single-layer encryption embodiments, the encrypted message itself may be inserted into or associated with encrypted portion 306. In the example embodiment, message decryption program 122 determines whether message 130 is intended for a single recipient or multiple recipients by determining whether the glyphs are associated with a single recipient or multiple recipients in the corresponding customer(s) encryption parameters/customer database 112.

In other embodiments where multi-layer encryption is utilized, the glyphs are still associated with a single decrypting key, however unlike single-layer decryption, encrypted portion 306 of message 130 may by decrypted into multiple messages corresponding to multiple recipients. With regard to multi-layer encryption, a single and generic message 130 may be generated for multiple recipients that, when captured, displays differing decryptions of encrypted portion 306 depending on the capturing recipient. In the example embodiment, starting glyph 302 and ending glyph 304 correspond to a multi-layer encrypted portion 306 and are associated with a list of potential recipients (rather than being directly associated with a single recipient in single-layer encryption). Each recipient on the list is associated with one or more personalized and encrypted messages specific to the recipient. Message decryption program 122 determines the relevant recipient for message 130 by comparing login information obtained when message decryption program 122 is booted (or the device is booted) by a recipient to metadata which contains information regarding each recipient on the list of potential recipients. In the example embodiment, the metadata may include information such as a recipient name, date of birth, profession, sex, etc., is further associated with one or more messages corresponding to each recipient. In the example embodiment, message decryption program 122 compares the obtained login information with the aforementioned metadata in order to determine the relevant message to display when encrypted portion 306 is captured. In other embodiments, message decryption program 122 may compare recipient information associated with the private key possessed by the capturing recipient to the aforementioned metadata in order to determine the relevant message to display when encrypted portion 306 is captured. In the example embodiment, although all recipients of message 130 may retain the same private key, message decryption program 122 only displays the particular message associated with a specific user (determined by way of containing the appropriate recipient information). For example, if Allen Jones captures message 130 of FIG. 3 that has been sent to recipients Allen Jones, Bob Jones, and Carl Jones, then message decryption program 122 determines which of the messages associated with starting glyph 302/ending glyph 304 to display to Allen Jones by comparing the login information of Allen Jones with the metadata associated with each recipient on the list of potential recipients. Thus, message decryption program 122 compares the information obtained when Allen Jones boots or logs into message decryption program 122 (such as his name, Allen Jones) with metadata associated with the each potential recipient associated with the glyphs (metadata such as recipient names). If the login information provided by the capturing recipient matches the metadata associated with a particular recipient on the list of potential recipients, message decryption program 122 decrypts encrypted portion 306 and displays the message corresponding to the matching recipient (Allen Jones) using the decryption key associated with the glyphs. In the example embodiment, other types of information, such as gender, profession, etc., may be used to reference the metadata and determine which message is relevant for a specific recipient. The type of information utilized in such a comparison may be designated by a system administrator when configuring encryption parameters in step 206.

In other embodiments, message decryption program 122 may be utilized by multiple entities to include one or more single-layer encrypted portions, such as encrypted portion 306, within message 130 before transmitting message 130 to the customer. In embodiments utilizing iterated, single-layer encrypted portions, differing glyphs are used to denote which portions have been encrypted by each entity. Similar to the single iteration of encrypted portion 306 in the example embodiment illustrated by the flowchart of FIG. 2, entities and recipients establish glyph and encryption parameters (including encrypting/decrypting keys) unique to the recipient which are stored in customer database 112. In some embodiments, each database, such as customer database 112, may be associated with a single entity, while in other embodiments a single customer database 112 may contain the encryption parameters and unique glyphs of all applicable entities. In some embodiments, multiple entities may encrypt each encrypted portion with identical keys such that a recipient may decrypt all encrypted portion 306 of the message with a single key. In regards to such embodiments, a single glyph can be associated with each encrypted portion regardless of the encrypting entity because a single decrypting key associated with the glyph can decrypt every encrypted portion. In other embodiments, each entity may encrypt with differing keys requiring the customer to maintain different decryption keys. In regards to such embodiments, each entity is associated with unique glyphs such that each glyph can be associated with a corresponding key (much like in the example embodiment illustrated by FIG. 2). Message decryption program 122 determines the encrypted portion by utilizing OCR to match starting glyph 302 and/or ending glyph 304 with the glyph corresponding to a recipient and/or entity detailed in customer database 112 (much in the same manner as described in step 206 of the FIG. 2 discussion). As previously mentioned, the glyphs designated during the configuration of customer encryption parameters may be associated with a single entity or multiple entities.

In further embodiments, message 130 may be a public document, such as a newsletter or progress report, where encrypted portion 306 serves as a redacted portion of a document only available to authorized individuals. For example, message 130 may be transmitted to all employees containing generic information about a company (quarterly earnings, etc.), however officers of the company may be capable of decrypting encrypted portion 306 containing confidential information (potential branch closings, etc.). In another example, public service announcements, such as breaking news stories, may contain an encrypted portion 306 that is capable of decryption by privileged individuals, such as police officers or firemen. In embodiments utilizing a single-layer encrypted portion 306 for redacted information, all recipients of message 130 generate a private key when configuring their encryption parameters in step 206 of FIG. 2. Recipients of like clearance levels/ranks are assigned identical glyphs and decryption keys such that when a company or government agency distributes message 130, an administrator encrypts encrypted portion 306 with the glyph and encrypting key corresponding to the decrypting key possessed by authorized recipients of the desired clearance level. In other embodiments where messages need vary from individual to individual rather than clearance level/rank, multi-layer encryption is utilized where the glyph included in message 130 corresponds to all recipients of message 130 and message decryption program 122 determines which encrypted message to decrypt for a particular recipient by comparing login information of the capturer with metadata associated with the list of recipients (much like in the multi-layer encryption process description above in FIG. 3).

In further embodiments, message 130 may be a hardcopy or softcopy document where starting glyph 302 and ending glyph 304 are included in the event that additional material need be amended to message 130. For example, if message 130 is a hardcopy user manual to a printer, then manufacturers may include starting glyph 302 and ending glyph 304 within message 130 in order to preserve the option of amending additional material to message 130 in the future, such as a product update. In embodiments utilizing glyphs for adding non-confidential or public amendments, identical glyphs are added to message 130 for products of the same type, such as the user manuals of the same series printer, as a single-layer encryption. The same identical glyphs are associated with a customer at purchase/registration and are saved in customer database 112. When amendments need be added to message 130, the entity/manufacturer uses message decryption program 122 to associate the encrypted message with the glyph corresponding to version(s) of message 130 needing amendments. Message decryption program 122 determines which customers require the amendment by searching customer database 112 for customers associated with the glyph and notifies them by mail, phone, or transmits a document update that a new amendment is available. When the customer captures message 130, message decryption program 122 associates the glyph with the amendment in the same manner as discussed above, and displays the amendment. In some embodiments, the customer may then save or print message 130 from message decryption program 122. In other embodiments utilizing glyphs for confidential and/or customer specific amendments, identical glyphs are printed on message 130 as a multi-layer encryption in much the same manner as described above in FIG. 3. The glyphs are associated with a list of customers and each customer is associated with an encrypted message and metadata detailing the recipient. When a customer captures message 130, login information is ascertained from the customer and compared to metadata associated with each recipient on the list of recipients associated with the glyphs. If the login information matches the metadata associated with a particular recipient, message decryption program 122 decrypts the encrypted message corresponding to the recipient using the decrypting key associated with the glyphs.

In further embodiments, message 130 may be a hardcopy or softcopy instruction manual or cookbook where starting glyph 302 and ending glyph 304 are incorporated for conversion of serving sizes or preferred units. For example, if message 130 is a cookbook, then starting glyph 302 and ending glyph 304 are included around serving sizes and measurements such that if a user alters the desired serving size, the ingredient measurements change accordingly. An author or publisher of a cookbook may add a multi-layer encrypted portion 306 to areas subject to change. Unlike the previous example of multi-layer encryption, the glyphs are associated with a list of different serving sizes and units (or a conversion table/calculator) rather than a list of potential recipients. Furthermore, each serving size on the list of serving sizes associated with the glyphs details the ingredient measurements corresponding to each different serving size, rather than an encrypted message for a particular recipient. In embodiments utilizing message decryption program 122 for converting measurements, the metadata associated with each entry on the list is the number of servings or units of measurement while the login information of each recipient is a user input of serving size or preferred units. For example, if a recipe makes 3 servings by default and Allen wants to make 8 servings, Allen inputs information stating the desired serving size (8 servings) into message decryption program 122 via a user interface. Message decryption program 112 compares the information with metadata associated with the glyphs which include information detailing ingredient measurements that correspond to different serving sizes. Message decryption program 122 decrypts (if necessary) and displays the ingredient measurements associated with a serving size of 8.

Figure 4:
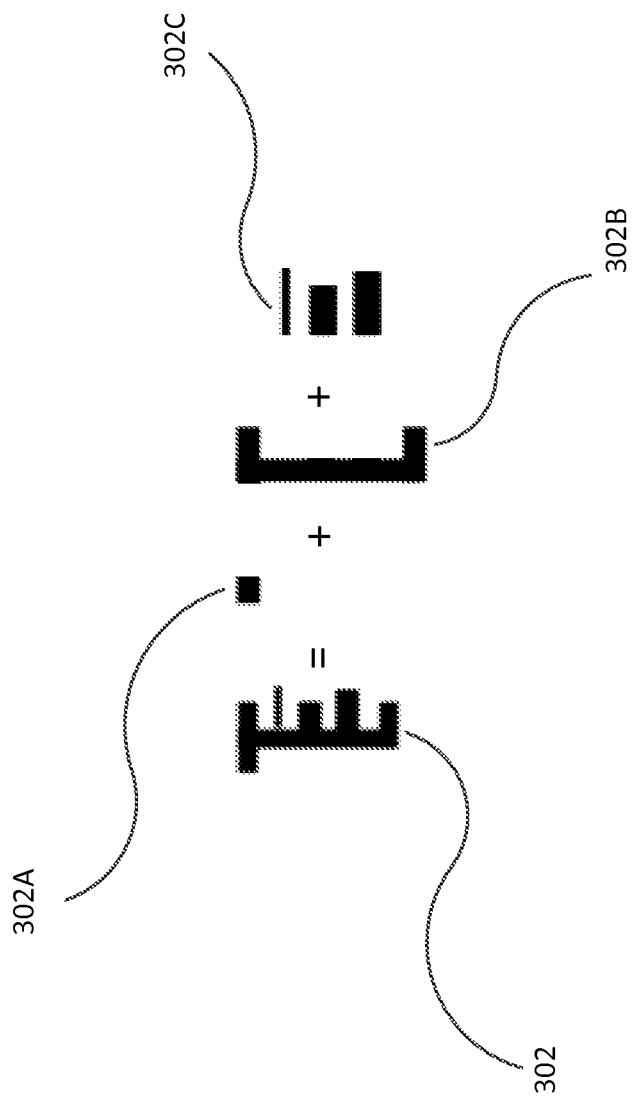
FIG. 4 illustrates an exploded view of a starting glyph contained in message 130, in accordance with an embodiment of the invention.

FIG. 4 illustrates an exploded view of starting glyph 302 contained in message 130. Both starting and ending glyphs are comprised of a start/end marker 302A, directional bracket 302B, and sender identifier 302C. Start/end marker 302A is indicative of whether the glyph is a starting glyph or ending glyph. Start/end marker 302A always points from directional bracket 302B away from encrypted portion 306 of message 130. Therefore, start/end marker 302A of starting glyph 302 points away from directional bracket 302B to the left in left-to-right reading languages. Conversely, start/end marker 302A of ending glyph 304 points away from directional bracket 302B to the right in right-to-left reading languages. Furthermore, start/end marker 302A is placed at the top on starting glyph(s) 302 and at the bottom of ending glyph(s) 304. Directional bracket 302B creates brackets surrounding encrypted message 306 and, therefore, starting glyph 302 contains a right-facing directional bracket 302B while ending glyph 304 contains a left-facing directional bracket 302B (in left-to-right reading languages). In the example embodiment, sender identifier key 302C faces encrypted portion 306 of message 130 and identifies the customer, as well as the encryption parameters, with a unique character. While FIG. 4 only illustrates starting glyph 302, ending glyph 304 is simply a flipped and mirrored starting glyph 302. Although only one portion of message 130 is encrypted in the example embodiment, any number of encrypted portions may be implemented in other embodiments. Furthermore, starting glyph 302 and ending glyph 304 may take different shapes and characteristics in other embodiments.

Figure 5:
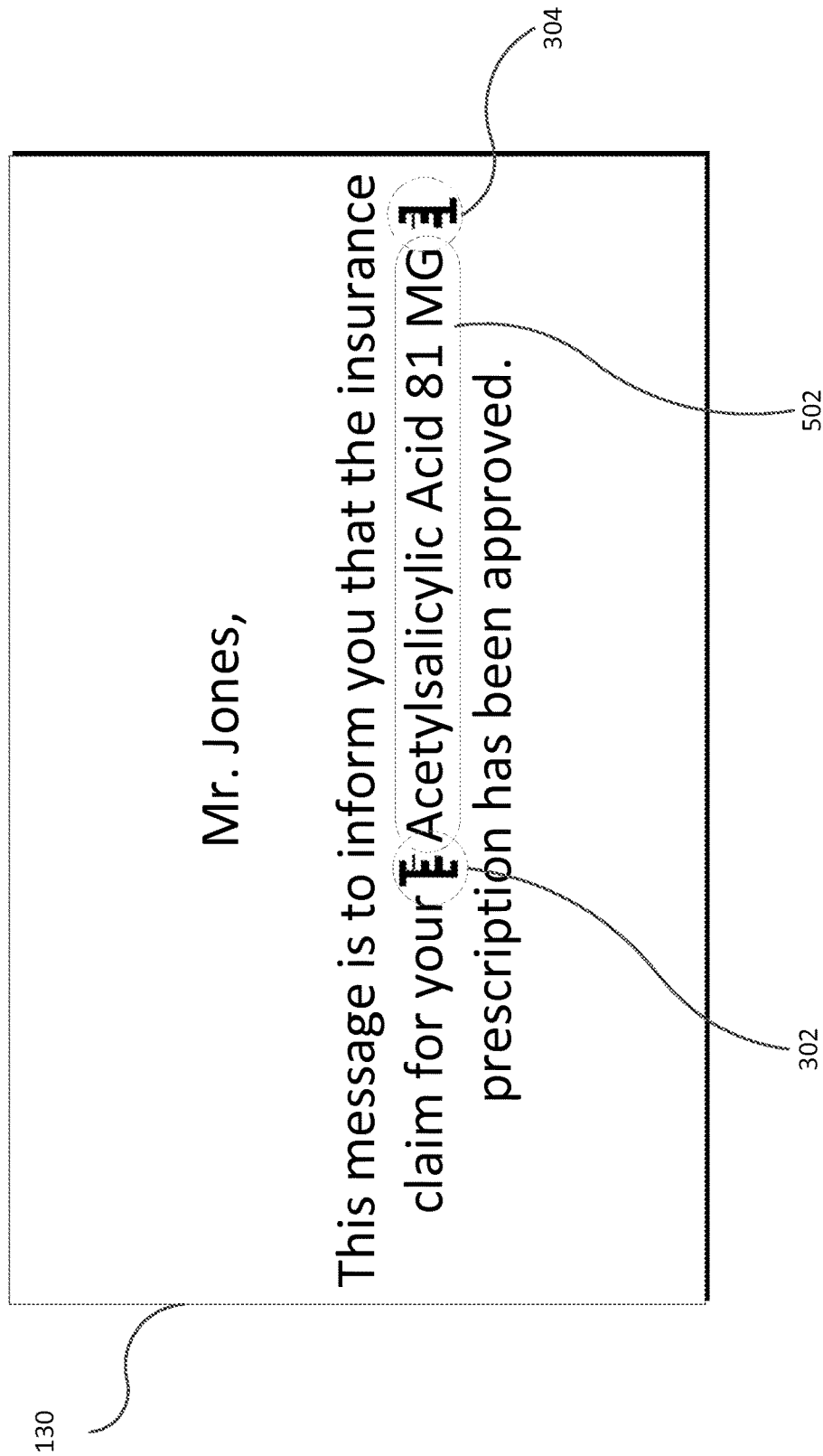
FIG. 5 illustrates a decrypted message 130, in accordance with an embodiment of the invention.

FIG. 5 depicts a decrypted message 130 containing starting glyph 302, ending glyph 304, and decrypted portion 502. In the example embodiment, decrypted portion 502 is decrypted by a customer using an asymmetric, private key generated by message decryption program 122.

Figure 6:
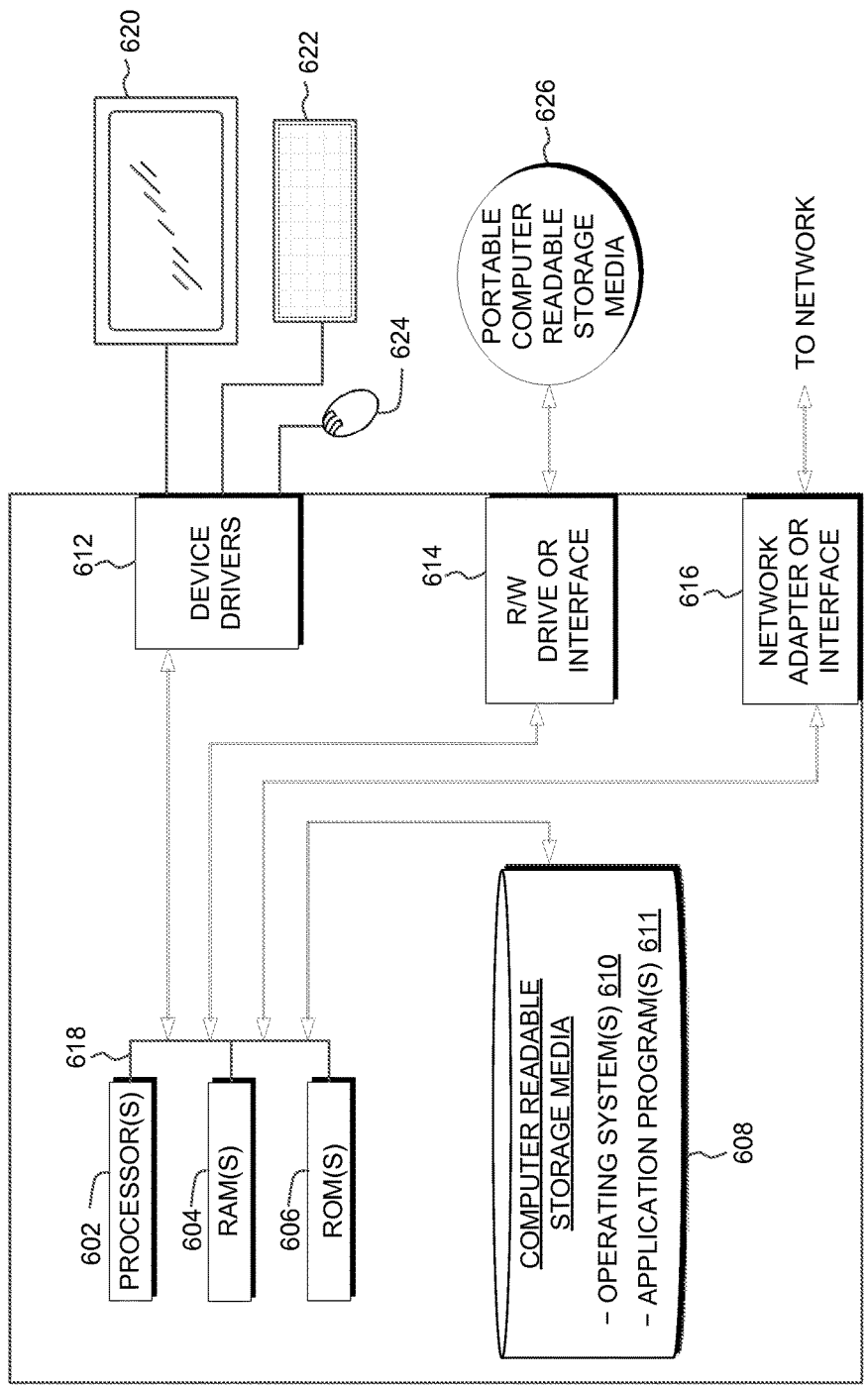
FIG. 6 is a block diagram depicting the hardware components of a message encryption system of FIG. 1, in accordance with an embodiment of the invention.

FIG. 6 depicts a block diagram of components of computing device 120 of a message encryption system 100 of FIG. 1, in accordance with an embodiment of the present invention. It should be appreciated that FIG. 6 provides only an illustration of one implementation and does not imply any limitations with regard to the environments in which different embodiments may be implemented. Many modifications to the depicted environment may be made.

Computing device 120 may include one or more processors 602, one or more computer-readable RAMs 604, one or more computer-readable ROMs 606, one or more computer readable storage media 608, device drivers 612, read/write drive or interface 614, network adapter or interface 616, all interconnected over a communications fabric 618. Communications fabric 618 may be implemented with any architecture designed for passing data and/or control information between processors (such as microprocessors, communications and network processors, etc.), system memory, peripheral devices, and any other hardware components within a system.

One or more operating systems 610, and one or more application programs 611, for example, message decryption program 122, are stored on one or more of the computer readable storage media 608 for execution by one or more of the processors 602 via one or more of the respective RAMs 604 (which typically include cache memory). In the illustrated embodiment, each of the computer readable storage media 608 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Computing device 120 may also include a R/W drive or interface 614 to read from and write to one or more portable computer readable storage media 626. Application programs 611 on computing device 120 may be stored on one or more of the portable computer readable storage media 626, read via the respective R/W drive or interface 614 and loaded into the respective computer readable storage media 608.

Computing device 120 may also include a network adapter or interface 616, such as a TCP/IP adapter card or wireless communication adapter (such as a 4G wireless communication adapter using OFDMA technology). Application programs 611 on computing device 120 may be downloaded to the computing device from an external computer or external storage device via a network (for example, the Internet, a local area network or other wide area network or wireless network) and network adapter or interface 616. From the network adapter or interface 616, the programs may be loaded onto computer readable storage media 608. The network may comprise copper wires, optical fibers, wireless transmission, routers, firewalls, switches, gateway computers and/or edge servers.

Computing device 120 may also include a display screen 620, a keyboard or keypad 622, and a computer mouse or touchpad 624. Device drivers 612 interface to display screen 620 for imaging, to keyboard or keypad 622, to computer mouse or touchpad 624, and/or to display screen 620 for pressure sensing of alphanumeric character entry and user selections. The device drivers 612, R/W drive or interface 614 and network adapter or interface 616 may comprise hardware and software (stored on computer readable storage media 608 and/or ROM 606).

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Based on the foregoing, a computer system, method, and computer program product have been disclosed. However, numerous modifications and substitutions can be made without deviating from the scope of the present invention. Therefore, the present invention has been disclosed by way of example and not limitation.

Various embodiments of the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer implemented method implemented using at least one or more computer processors for decrypting a message, the method comprising:
    associating, by at least the one or more computer processors, a set of glyphs with metadata corresponding to one or more users:
    associating a first key and a second key with the metadata of a first user of the one or more users;
    associating the first key and a third key with the metadata of a second user of the one or more users;
    receiving a message from an entity containing one or more encrypted portions, wherein the one or more encrypted portions are encrypted using the first key;
    determining that the one or more glyphs are contained in the message, wherein the one or more glyphs denote the one or more encrypted portions of the message
    in response to determining that the first user received the message based on the metadata associated with the first user, decrypting the one or more encrypted portions of the message using the second key to reveal a first message; and
    in response to determining that the second user received the message based on the metadata associated with the second user, decrypting the one or more encrypted portions of the message using the third key to reveal a second message.

2. The method of claim 1, wherein the first key and the second key implement symmetrical encryption.

3. The method of claim 1, wherein the first key and the third key implement asymmetrically encryption.

4. The method of claim 1, wherein the message is contained on a physical document, and wherein receiving the message from the entity further comprises:
    capturing a digital version of the physical document.

5. A computer program product for message decryption, the computer program product comprising:
    one or more non-transitory computer-readable storage media and the program instructions stored on the one or more non-transitory computer-readable storage media, the program instructions comprising:
    program instructions to associate a set of glyphs with metadata corresponding to one or more users;
    program instructions to associate a first key and a second key with the metadata of a first user of the one or more users;
    program instructions to associate the first key and a third key with the metadata of a second user of the one or more users;
    program instructions to receive a message from an entity containing one or more encrypted portions, wherein the one or more encrypted portions are encrypted using the first key;
    program instructions to determine that the one or more glyphs are contained in the message, wherein the one or more glyphs denote the one or more encrypted portions of the message
    in response to determining that the first user received the message based on the metadata associated with the first user, program instructions to decrypt the one or more encrypted portions of the message using the second key to reveal a first message; and
    in response to determining that the second user received the message based on the metadata associated with the second user, decrypting the one or more encrypted portions of the message using the third key to reveal a second message.

6. The computer program product of claim 5, wherein the first key and the second key implement symmetrical encryption.

7. The computer program product of claim 5, wherein the first key and the second key implement asymmetrically encryption.

8. The computer program product of claim 5, wherein the message is contained on a physical document, and wherein receiving the message from the entity further comprises:
    program instructions to capture a digital version of the physical document.

9. A computer system for message decryption, the computer system comprising:
    one or more computer processors, one or more non-transitory computer-readable storage media, and program instructions stored on one or more of the non-transitory computer-readable storage media for execution by at least one of the one or more computer processors, the program instructions comprising:
    program instructions to associate a set of glyphs with metadata corresponding to one or more users;
    program instructions to associate a first key and a second key with the metadata of a first user of the one or more users;
    program instructions to associate the first key and a third key with the metadata of a second user of the one or more users;
    program instructions to receive a message from an entity containing one or more encrypted portions, wherein the one or more encrypted portions are encrypted using the first key;
    program instructions to determine that the one or more glyphs are contained in the message, wherein the one or more glyphs denote the one or more encrypted portions of the message
    in response to determining that the first user received the message based on the metadata associated with the first user, program instructions to decrypt the one or more encrypted portions of the message using the second key to reveal a first message; and
    in response to determining that the second user received the message based on the metadata associated with the second user, decrypting the one or more encrypted portions of the message using the third key to reveal a second message.

10. The computer system of claim 9, wherein the first key and the second key implement symmetrical encryption.

11. The computer system of claim 9, wherein the first key and the second key implement asymmetrical encryption.

12. The computer system of claim 9, wherein the message is contained on a physical document, and wherein receiving the message from the entity further comprises:
    program instructions to capture a digital version of the physical document.

* * * * *